(12) United States Patent
Ringuette et al.

(10) Patent No.: US 11,250,227 B1
(45) Date of Patent: Feb. 15, 2022

(54) DECRYPTION OF QUICK RESPONSE OR OTHER CODE TO PRESENT CONTENT ON DISPLAY

(71) Applicant: Lenovo (Singapore) Pte. Ltd., Singapore (SG)

(72) Inventors: Justin Michael Ringuette, Morrisville, NC (US); Robert Norton, Raleigh, NC (US); Sandy Scott Collins, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/935,585

(22) Filed: Jul. 22, 2020

(51) Int. Cl.
    *G06K 7/14*     (2006.01)
    *H04L 9/08*     (2006.01)
    *H04L 9/32*     (2006.01)

(52) U.S. Cl.
    CPC .......... *G06K 7/1417* (2013.01); *H04L 9/0825* (2013.01); *H04L 9/3213* (2013.01)

(58) Field of Classification Search
    CPC ... G06F 3/012; G06F 16/9554; G02B 27/017; G02B 2027/0138; G06K 9/00671
    See application file for complete search history.

(56) References Cited

U.S. PATENT DOCUMENTS

| 2019/0028278 A1* | 1/2019 | Gilson | G06F 12/1408 |
| 2020/0293778 A1* | 9/2020 | Elliott | G06K 9/4604 |
| 2021/0258165 A1* | 8/2021 | Woo | G06K 19/06037 |

OTHER PUBLICATIONS

"Cryptography", Wikipedia, retrieved Jun. 3, 2020 from https://en.wikipedia.org/wiki/Cryptography.
"QR Code", Wikipedia, retrieved Jun. 3, 2020 from https://en.wikipedia.org/wiki/QR_code.
"Secure Encrypted QR Code Generation | Electronic Authentication with App and Validation Server", QRYPTAL, retrieved Jun. 3, 2020 from https://www.qryptal.com/technology/overview/.

* cited by examiner

*Primary Examiner* — Kristy A Haupt
(74) *Attorney, Agent, or Firm* — John M. Rogitz; John L. Rogitz

(57) ABSTRACT

In one aspect, a device may include at least one processor, a display accessible to the at least one processor, a camera accessible to the at least one processor, and storage accessible to the at least one processor. The storage may include instructions executable by the at least one processor to identify a decryption key, receive input from the camera, identify a quick response (QR) code based on the input from the camera, and use the decryption key to decrypt at least part of the QR code. The instructions may also be executable to identify a subset of content indicated via the QR code based on the decryption of the QR code and to then present the subset of content on the display.

20 Claims, 9 Drawing Sheets

DECRYPTION OF QUICK RESPONSE OR OTHER CODE TO PRESENT CONTENT ON DISPLAY

FIELD

The present application relates to technically inventive, non-routine solutions that are necessarily rooted in computer technology and that produce concrete technical improvements.

BACKGROUND

As recognized herein, in the modern age of technology many electronic message boards and software applications provide voluminous amounts of digital content en masse without tailoring the content to a particular user. Moreover, often times the content is not digitally secured even if the content is private or confidential in nature, and many of the existing methods for protecting digital content from unauthorized access are still highly susceptible to attack for various reasons. Accordingly, there are currently no adequate solutions to the foregoing computer-related, technological problem.

SUMMARY

Accordingly, in one aspect a first device includes at least one processor, a display accessible to the at least one processor, a camera accessible to the at least one processor, and storage accessible to the at least one processor. The storage includes instructions executable by the at least one processor to identify a decryption key, receive input from the camera, identify a quick response (QR) code based on the input from the camera, and use the decryption key to decrypt at least part of the QR code. The instructions are also executable to identify a subset of content indicated via the QR code based on the decryption of the QR code and to then present the subset of content on the display.

In some example implementations, the instructions may be executable to identify the subset of content indicated via the QR code and identify additional content indicated via the QR code based on the decryption of the QR code, and to present the subset of content and the additional content on the display.

Additionally or alternatively, the instructions may be executable to present the subset of content on the display but not present additional content on the display that is identifiable via decryption of the QR code. Thus, for example, the subset of information to present may be indicated via the decryption key itself.

The decryption key may be received via email from a second device different from the first device. Additionally or alternatively, the input from the camera may be first input from the camera and the instructions may be executable to receive second input from the camera and to identify the decryption key based on the second input. So, for example, the instructions may be executable to use the second input to read the decryption key from a non-electronic document indicated via the second input.

Still further, in some example implementations the display may be a first display and the instructions may be executable to identify the QR code from a second display based on the input from the camera, where the second display is different from the first display, and to present the subset of content on the first display using augmented reality processing so that the subset of content appears via the first display to be disposed on at least a portion of the second display.

In some examples, the first device may be a headset and the display may be an at least partially transparent display. In other examples, the first device may be a mobile device other than a headset.

In another aspect, a method includes identifying, using a first device, a decryption key, receiving input from a camera on the first device, and identifying a code based on the input from the camera. The method also includes using the decryption key to decrypt at least a first part the code and, based on the decryption of at least the first part of the code, identifying content indicated via at least the first part of the code. The method further includes presenting the content on an electronic display of the first device using augmented reality software so that the content appears disposed in the real world apart from the first device.

In some example implementations, the code may be a quick response (QR) code.

Also in some example implementations, the content may be first content and the method may include using the decryption key to decrypt the first part of the code but not all of the code to identify the first content. The method may then include presenting the first content on an electronic display but not presenting second content on the electronic display related to parts of the code other than the first part. So, for example, the decryption key may be configured to decrypt the first part of the code but will not decrypt at least one other part of the code.

Still further, in some examples the content may be first content and the method may include using the decryption key to decrypt the first part of the code and a second, different part of the code. In these examples, the method may also include using the decryption key to identify which of the first content indicated in the first part and second, different content indicated in the second part to present. The first content may be identified for presentation based on data indicated in the decryption key. The method may then include presenting the first content on the electronic display of the first device using augmented reality software so that the first content appears disposed in the real world apart from the first device.

Further, in some example embodiments the code may be identified, based on the input from the camera, as presented on a second device different from the first device. So, for example, the electronic display may be a first electronic display and the method may include presenting the content on the first electronic display of the first device using augmented reality software so that the content appears disposed in the real world on or within a threshold distance of a second electronic display of the second device.

Additionally, in some examples the input from the camera may be first input from the camera and the method may include receiving second input from the camera. The method may then include identifying the decryption key, based on the second input, from a non-electronic document.

In still another aspect, at least one computer readable storage medium (CRSM) that is not a transitory signal includes instructions executable by at least one processor to configure, at a first device, a first part of a quick response (QR) code to be decrypted with a first key and to configure, at the first device, a second part of the QR code to be decrypted with a second key. The second part is different from the first part. The instructions are also executable to make the first key available to a second device and make the second key available to a third device, where the first, second, and third devices are different from each other. The instructions are also executable to one or more of control an electronic display to present the QR code, and/or transmit the QR code to a fourth device different from the first, second, and third devices. In some examples, the second key may be different from the first key.

The details of present principles, both as to their structure and operation, can best be understood in reference to the accompanying drawings, in which like reference numerals refer to like parts, and in which:

DETAILED DESCRIPTION

Figure 1:
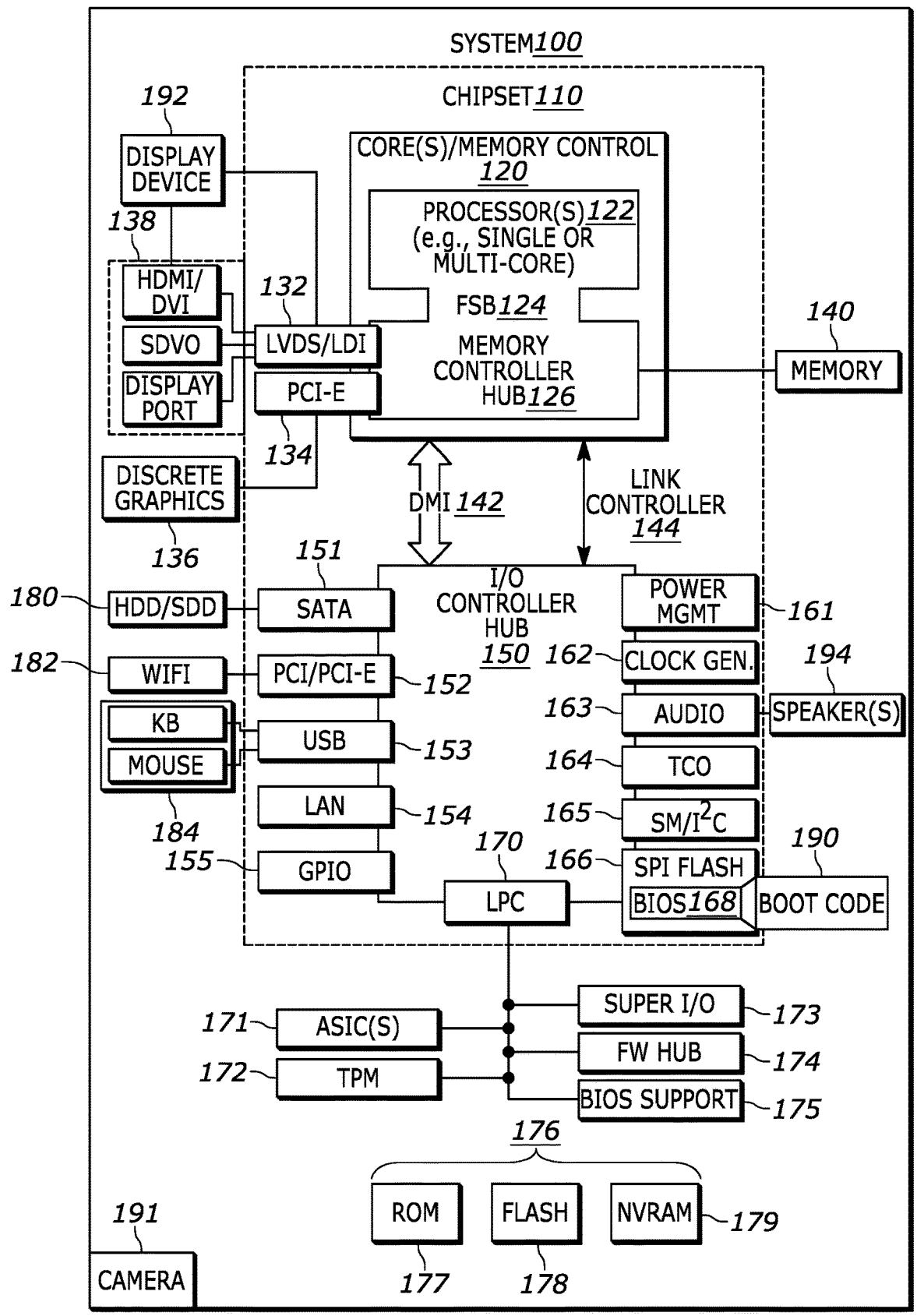
FIG. 1 is a block diagram of an example system consistent with present principles.

The present disclosure is directed to, among other things, encoding data visually such as into an encrypted QR code so that a decryption key can be shared out-of-band to an intended user (e.g., printed on a paper boarding pass or shared over a secure e-mail). This key sharing can be done prior to consumption of the QR code itself, at a time and place that may be more secure or convenient. Then, using an augmented reality device such as a smartphone or AR glasses, the encrypted code may be captured and decrypted with the user's key, providing the user with a virtual display of their user-specific content.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to hypertext markup language (HTML)-5, Java®/JavaScript, C# or C++, and can be stored on or transmitted from a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Still further, as shown in FIG. 1 the system 100 may also include a camera that gathers one or more images and provides images and related input to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video.

Additionally, though not shown for simplicity, in some embodiments the system 100 may include a gyroscope that senses and/or measures the orientation of the system 100 and provides related input to the processor 122, as well as an accelerometer that senses acceleration and/or movement of the system 100 and provides related input to the processor 122. Still further, the system 100 may include an audio receiver/microphone that provides input from the microphone to the processor 122 based on audio that is detected, such as via a user providing audible input to the microphone. Also, the system 100 may include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
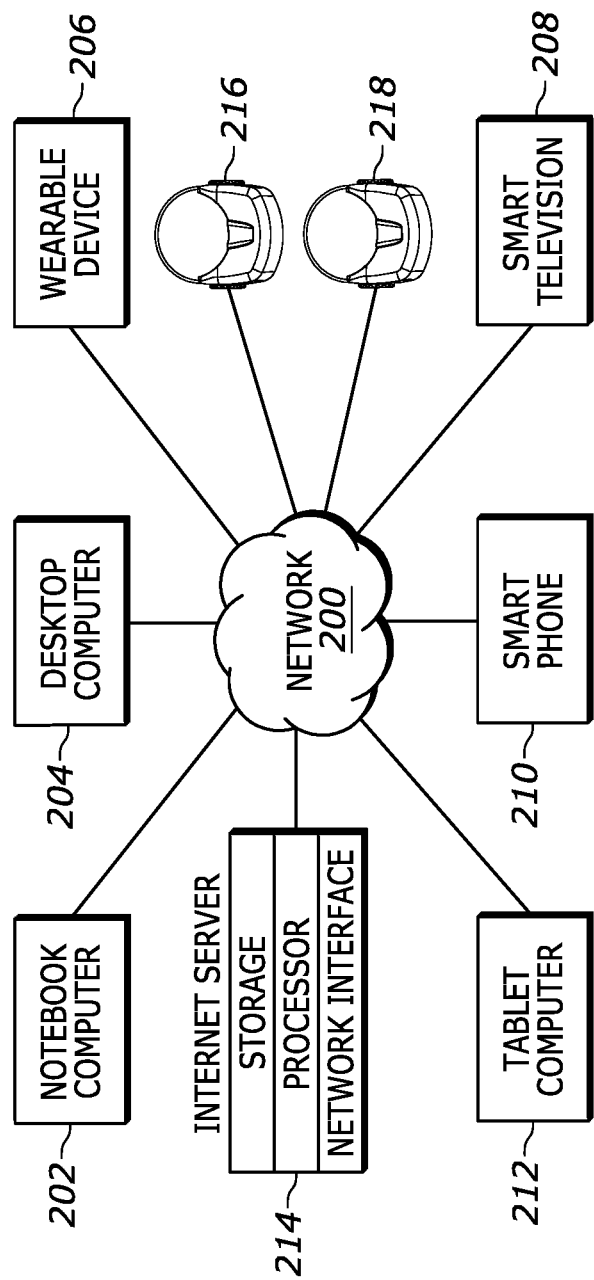
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, headsets 216 and 218, and a server 214 such as an Internet server that may provide cloud storage accessible to the devices 202-212, 216, 218. It is to be understood that the devices 202-218 are configured to communicate with each other over the network 200 to undertake present principles.

Figure 3:
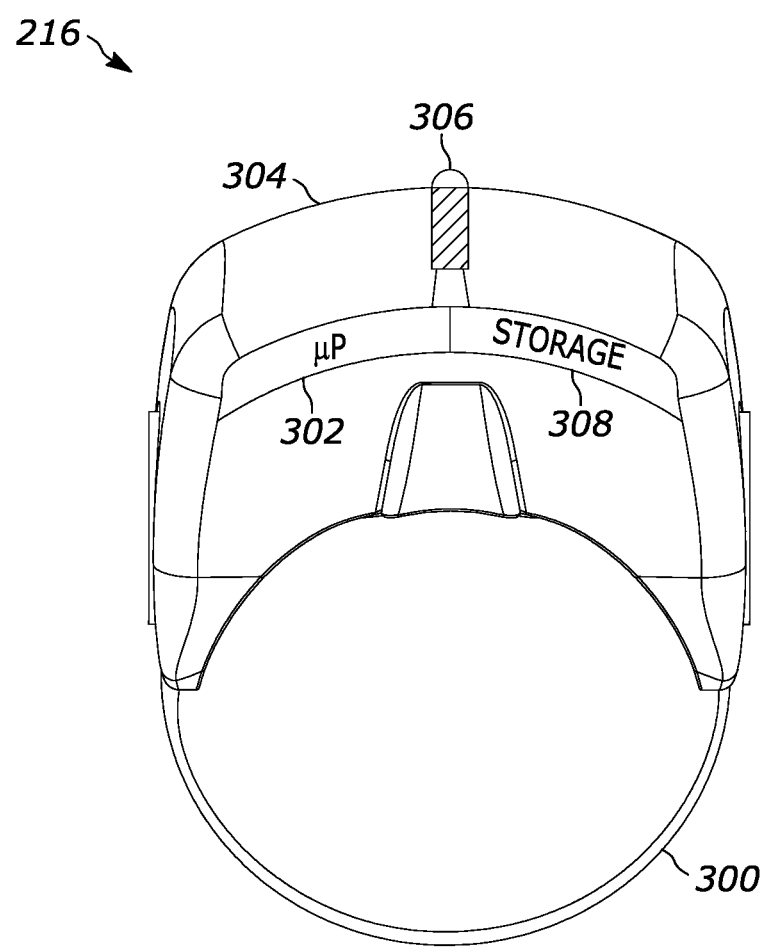
FIG. 3 is a block diagram of an example headset consistent with present principles.

Now describing FIG. 3, it shows a top plan view of a headset, such as the headset 216, consistent with present principles. The headset 216 may include a housing 300, at least one processor 302 in the housing, and a transparent "heads up" display 306 accessible to the at least one processor and coupled to the housing. The display 306 may for example have discrete left and right eye pieces as shown for presentation of stereoscopic and/or augmented reality images/objects consistent with present principles.

The headset 216 may also include one or more forward-facing cameras 306. As shown, the camera 306 may be mounted on a bridge portion of the display 304 so that it may have an outward-facing field of view similar to that of a user wearing the headset 216. However, the camera(s) 306 may be located at other headset locations as well.

The camera(s) may be used for, among other things, identifying quick response (QR) codes and other codes (e.g., another type of matrix barcode code, etc.), as well as computer vision, image registration, spatial mapping, and/or simultaneous localization and mapping (SLAM) for augmented reality (AR) processing and presentation of AR content consistent with present principles. Further note that in some examples that inward-facing cameras may also be mounted within the headset 216 and oriented to image the user's eyes for eye tracking while the user wears the headset 216.

Additionally, the headset 316 may include storage 308 accessible to the processor 302 and coupled to the housing 300, as well as still other components not shown for simplicity such as a network interface for communicating over a network such as the Internet and a battery for powering components of the headset 216 such as the camera(s) 306. Additionally, note that while the headset 216 is illustrated as a head-circumscribing augmented reality (AR) headset, it may also be established by computerized smart glasses or another type of headset.

For example, the headset may be established by a virtual reality (VR) headset that may not have a transparent display but may still be able to present virtual AR objects/content on its display along with a real-world, real-time camera feed of an environment imaged by the front-facing camera(s) 306 to provide an AR experience to the user. This AR technique might similarly apply to other mobile devices with non-transparent displays, such as smart phones.

Figure 4:
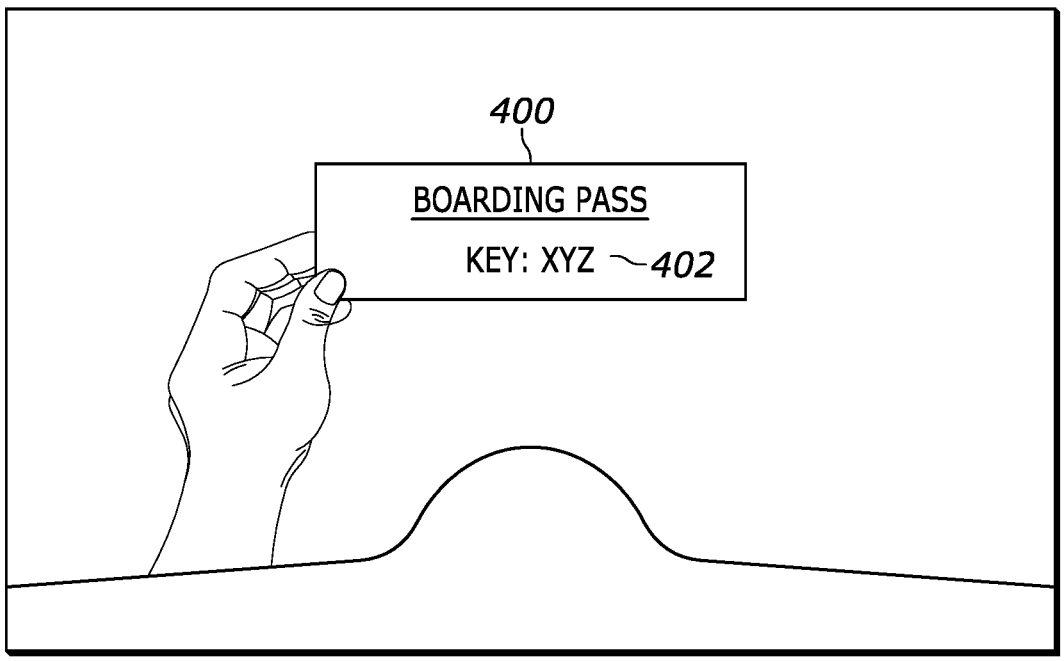
FIGS. 4-9 illustrate an example of a QR code presented on an airport display as well as examples of the corresponding user-relevant content that might be identified from the QR code and presented on an AR device's display.

Now in reference to FIGS. 4-9, suppose a user of a headset or other augmented reality (AR) device such as a mobile phone has booked a flight from Raleigh-Durham airport to Baltimore-Washington airport. As shown in FIG. 4, the user might be physically holding a non-electronic document such as a flight boarding pass 400 in his or her hand. The boarding pass 400 might have been printed from an email sent to the user responsive to booking the flight or provided to the user at the airport upon checking in, for example.

FIG. 4 shows the boarding pass 400 from the perspective of the user while wearing the AR headset, and so upon the user looking at the boarding pass 400 within the field of view of a camera on the headset, the headset may use one or more images from the camera that show the boarding pass 400 to execute object recognition, text recognition and/or optical character recognition, etc. in order to identify a decryption key 402 printed on the face of the non-electronic, paper boarding pass 400. The decryption key 402 may then be stored by the headset and used by the headset at a later time as set forth below.

Figure 5:
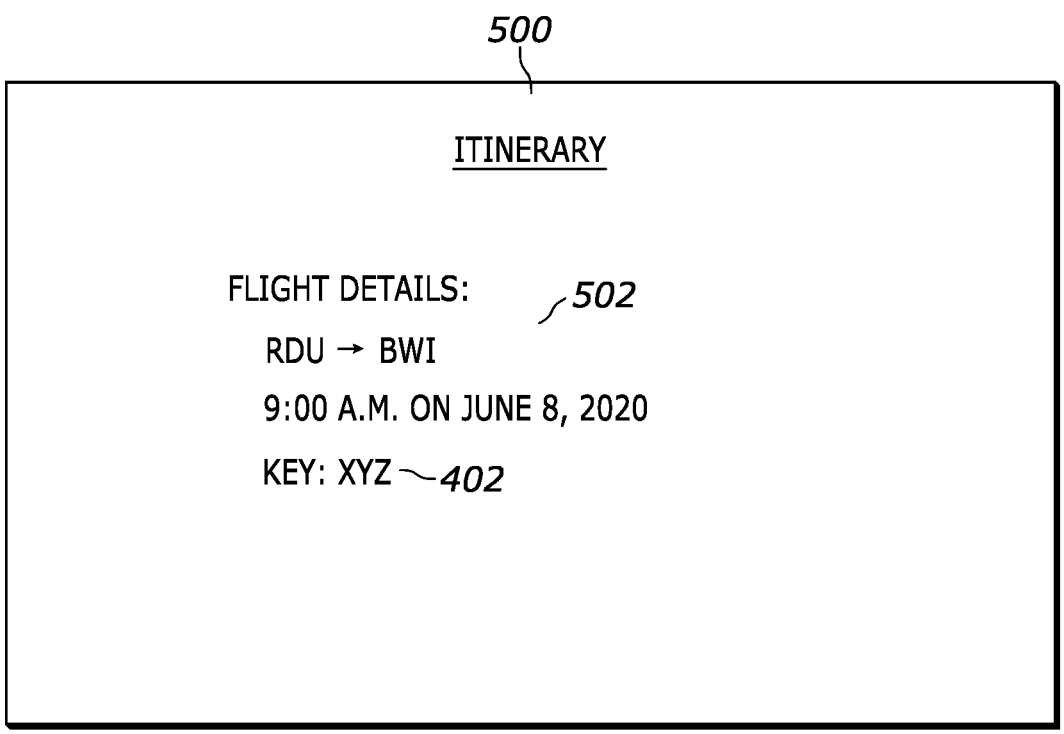

However, before describing how the key 402 might be used, reference is first made to FIG. 5. This figure shows another way in which the key 402 might be identified by the user's headset. FIG. 5 shows an email 500 that might be provided to the user at the user's email address responsive to booking the flight. The email 500 may include an itinerary 502 with details on the flight itself as well as text indicating the key 402. The user's headset or another device in communication therewith, having access to the user's email account, may automatically parse the email 500 upon being received at the user's email account to identify the key 402.

The key may be identified from the email 500 using a digital assistant such as Amazon's Alexa or Apple's Siri, text/word recognition, and/or optical character recognition, etc. The key 402 may then be stored at a local storage location on the headset for future use.

In reference to both of FIGS. 4 and 5, in some examples the key 402 may be accompanied by other information, on the boarding pass 400 or email 500, that is associated with the key 402. This information might include an expiration date and time for the key 402 that occurs after the date and time of the scheduled flight itself. After the expiration date/time, the key 402 may longer be usable for decryption as set forth below. Thus, in some examples the key 402 itself may be configured as an expiring key according to the expiring date/time. The other information might also include an indication that the key 402 is to be used to decode a quick response (QR) code or other code at a later time. The expiration information and/or indication of key use may also be stored in local storage at the headset upon being recognized by the headset.

Figure 6:
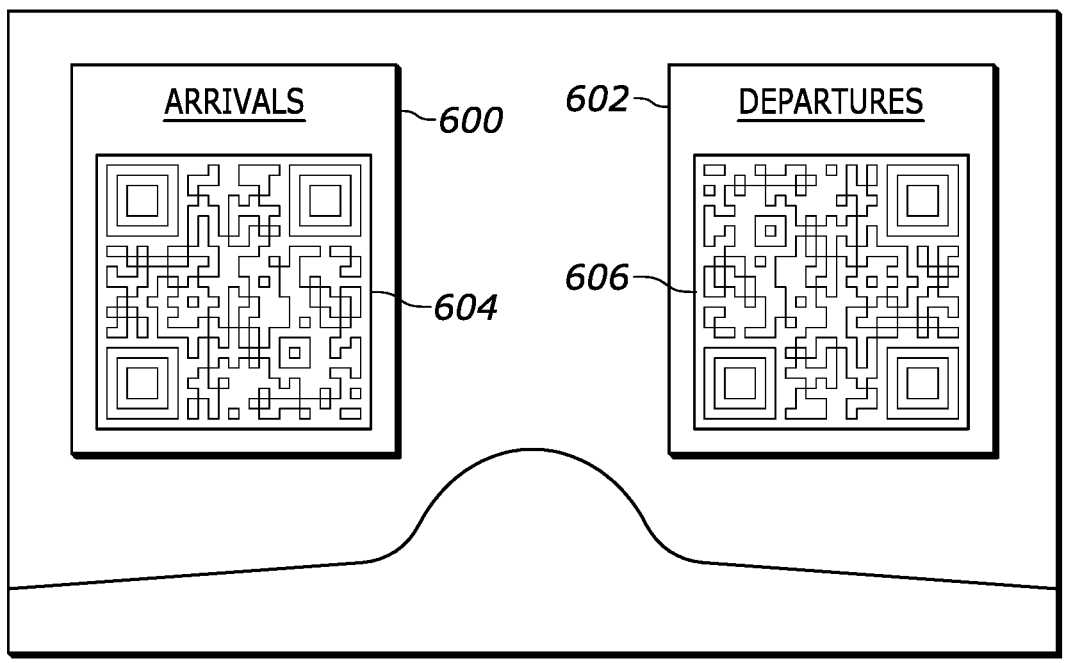

Then when the user arrives at the airport for his or her flight, the user might look at electronic displays 600, 602 mounted in the airport while wearing the AR headset, as shown in FIG. 6. Note that this figure depicts the displays 600, 602 from the perspective of the user while looking out of the transparent display of the headset. As shown, the display 600 may show the word "Arrivals" to indicate that the display 600 is presenting information on flights arriving into Raleigh-Durham airport, while the display 602 may show the word "Departures" to indicate that the display 602 is presenting information on flights departing from Raleigh-Durham airport. But, rather than listing flights coming in or out of the airport by arrival or departure time, city, or another metric, respective QR codes 604, 606 are presented on the displays 600, 602. The user's headset may then use input from its forward-facing camera that mimics the field of view of the user to execute object recognition and identify the QR codes 604, 606 from the input. Responsive to identifying the QR codes 604, 606, the headset may then determine that the QR codes might possibly be decrypted using the key 402, e.g., owing to already having been notified that the key 402 might be used to decrypt a QR code according to the paragraph immediately above. Or, upon recognizing the QR code, the headset might simply try to decrypt it using the key 402 based on software programming instructions to make such an attempt.

In either case, the headset may then use the key 402 to attempt to decrypt all or part of one or both of the QR codes 604, 606. Or, if the headset recognizes that the user is scheduled to depart from Raleigh-Durham airport that day based on its previous parsing of the email 500, the boarding pass 400, or an entry in an electronic calendar of the user, the headset might only attempt to decode the QR code 606 once the word "Departures" is recognized from the display 602 using optical character recognition and/or word recognition. Regardless, in various example implementations the key 402 might be configured to decrypt all of both codes 604, 606, all of one of the codes 604, 606, or only part of one or both of the codes 604, 606 depending on configuration of the codes 604, 606 as well as key 402. In relation to FIGS. 7-9 below, assume at least part of the code 606 has been decrypted with the key 402.

Accordingly and beginning first with FIG. 7, again the real-world displays 604, 606 that are different from the headset's own transparent display are shown. However, the headset's own display has now presented digital content 700 and 702 on its transparent display to appear as overlaid over top of the QR codes 604, 606 on the displays 600, 602 themselves. This may be done using AR processing/software to make it appear as though the digital content 700, 702 is actually disposed in the real world on the displays 600, 602 rather than being presented on the transparent display of the headset itself.

Figure 7:
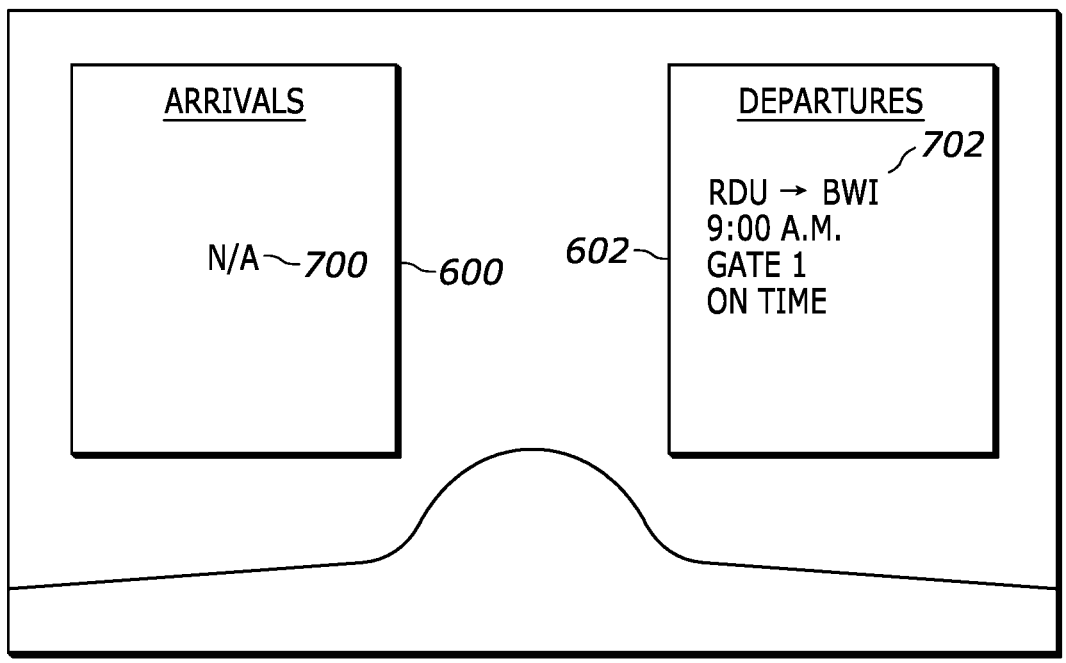

Thus, as shown in FIG. 7 the digital content 700 is presented on the headset's display to mimic, using AR processing, the content 700 as actually being presented on the display 600. In this example, the content 700 includes the characters "N/A", as in "not applicable" to notify the user that the user need not look at the display 600 for information on his or her outgoing flight from Raleigh-Durham to Baltimore-Washington. However, also note that other electronic content actually presented by the display 600 is still perceptible to the user through the transparent display of the headset, with that content being the word "Arrivals" to allow the user to see through the transparent display to read the text "Arrivals" on the display 600 so that the user may still be able to discern that the display 600 is presenting flight arrival information.

As also shown in FIG. 7, the digital content 702 is presented on the headset's display to mimic, using AR processing, the content 702 as actually being presented on the display 602. In this example, the content 702 includes flight information only for the user's flight and not for other flights the user is not taking. As shown, the flight information might include the flight route (Raleigh-Durham to Baltimore-Washington in this case) or flight destination, the time of departure, the gate of departure, and whether the flight is on time or delayed (on time in this case). Though not shown for simplicity, the flight information presented on the headset's transparent display might also include a flight number for the flight. However, also note that other electronic content not connected to any particular flights and that is actually presented by the display 602 may still be perceptible to the user through the transparent display, with that content being the word "Departures" to allow the user to see through the transparent display to read the text "Departures" on the display 602 so that the user is able to discern that the display 602 is presenting flight departure information, possibly for additional flights besides the one the user is taking to Baltimore-Washington airport.

As for the content 702 itself, note that this content may have been encoded into the QR code 606 using an encryption algorithm so that it may be decrypted by the user's headset using the key 402. The QR code 606 may even be periodically updated by the airport, air carrier, or other entity so that the QR code 606 reflects real-time, up-to-date information on the user's flight (including whether the flight is on time, for instance). But also note that the QR code 606 may still be configured with each update to still be decryptable using the key 402 so that the user's headset need not have network connectivity (or at least secure network connectivity) or otherwise need to go access a new key each time the content encoded into the QR code 606 for departing flights is updated.

But whether the QR code is an updated or new QR code, is to be more generally understood that a QR code can be encoded with alphanumeric characters, and/or encoded with bytes that themselves can be converted to alphanumeric characters or even images. Thus, consistent with present principles the underlying characters or bytes themselves for the associated content that is to be presented at the AR device may first be encrypted into a text or byte string, and then that string may itself be encoded into a QR code. Symmetrical or asymmetrical encryption may be used to do so, and then a decryption key may be used as disclosed herein to decrypt the encrypted text or byte string to access the content itself. For symmetrical key encryption, the same key may be used to encrypt and decrypt. For asymmetrical key encryption, different keys may be used to encrypt and decrypt. Examples of encryption algorithms that may be used include DES/3DES, Blowfish, AES, MD5, SHA 1, HMAC, and Diffie-Hellman and RSA algorithms.

Additionally, note again that different parts of a same QR code can be encrypted for decryption with different decryption keys so that, for example, the single QR code 606 may indicate plural contents tailored to different users, which in the present example might include flight information for different flights. Thus, different keys provided to different AR devices can be used to decrypt different parts of the same QR code (e.g., a top, bottom, left, or right portion) so that any given user's headset might only decrypt and present a subset of the content that is relevant to the associated user after the associated user has been provided by the airport, carrier, etc. with the designated decryption key for the user's specific content.

But regardless of whether the key provided to any given user can decrypt all or part of the same QR code, also note in relation to QR codes that might be updated to reflect real-time information (e.g., as described above) that the headset or other AR device may, for example, decrypt the same QR code every threshold number of seconds (e.g., every five seconds) and/or every time the QR code again comes within the camera's field of view after being out of view. This may be done so that the updated content can be presented on the AR device's display after every decryption to keep the user up to date on the changing content as might be reflected in the same QR code at different times.

As also described above, in examples where a decryption key provided to a user decrypts all of a QR code or even decrypts only part of the code, note that the decryption key to be used by the AR device may have a designated place within or attached to the decryption key that might vary by user and might not be used for decryption itself, but that the AR device knows to access or parse and which indicates both the relevant part of the QR code for decryption for a given user and/or the relevant part of the coded underlying content itself to present or highlight to the user.

The designated place in the encryption key might include other information as well, such as content-presentation location information for whether to present the user's content over top of a corresponding object presenting the QR code itself or to present the user's content proximate to it instead. However, also note that the software already executing at the AR device to decrypt the QR code and present associated content to the user might already be configured by the software developer or based on end-user preference to present the associated content over top of the corresponding object presenting the QR code itself or to present the user's content proximate to it instead.

Figure 8:
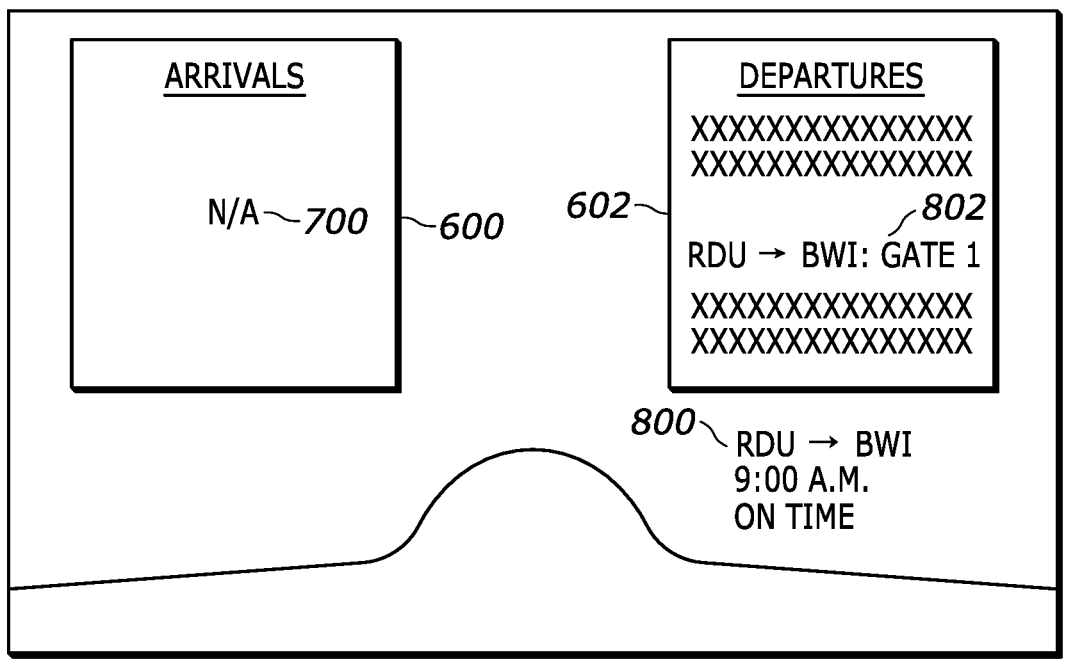

Thus, while FIG. 7 shows the associated content being presented over top of the corresponding object presenting the QR code (the display 602 in this case), FIG. 8 shows an alternate implementation where the associated content is presented on the AR headset's transparent display using AR processing to appear as though located within a threshold X-Y distance of the display 602 in the real world, in a same plane as the front of the display itself but not actually presented on the display 602. Thus, content 800 may include some or all of the same content as the content 702 of FIG. 7, but may be presented offset from the display 602. However, in some examples other content 802 might still be presented using the headset's display to appear as though presented by and on the display 602, such as a gate number for where the user's flight is departing from in Raleigh-Durham airport.

Figure 9:
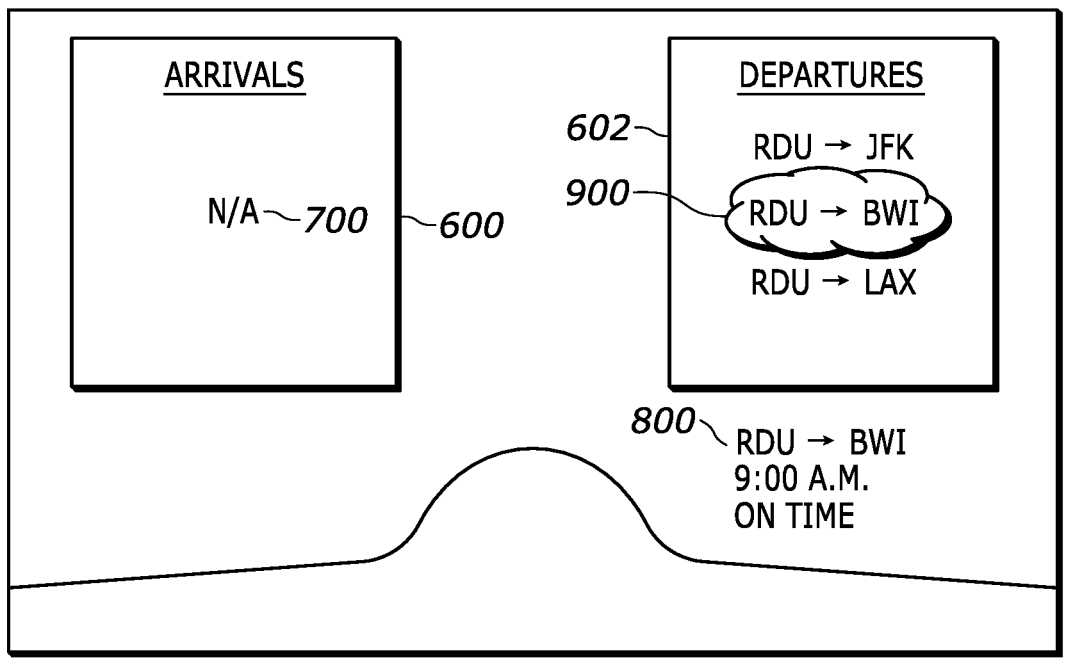

Yet another example is shown in FIG. 9. Distinguishing FIG. 9 from FIGS. 7 and 8, in this example the user's headset has used the decryption key 402 to decrypt not only the flight information relevant to the user but also other parts of the QR code 606 indicating a listing of other departing flights that are irrelevant to the user. The same content 802 as described in reference to FIG. 8 may still be offset from the display 602, but in this case the user's flight may also be highlighted in the virtual listing by the headset by presenting an AR graphic 900 (a bubble in this case) on its transparent display to appear as though presented on the display 602 itself. This may be done so that the user can quickly distinguish the subset of content relevant to the user from the listing of other departing flights as also indicated in the QR code 606 and presented on the headset's display.

However, further note that in other implementations the listing of departing flights might actually be presented on the display 602 itself along with the QR code 606, and thus in these implementations the AR graphic 900 may still be presented on the headset's display to surround and therefore highlight the user's flight from the listing as presented on the display 602. This may be done based on identifying information for the user's flight encrypted into the QR code 606 as indicated in the key 402 itself.

Figure 10:
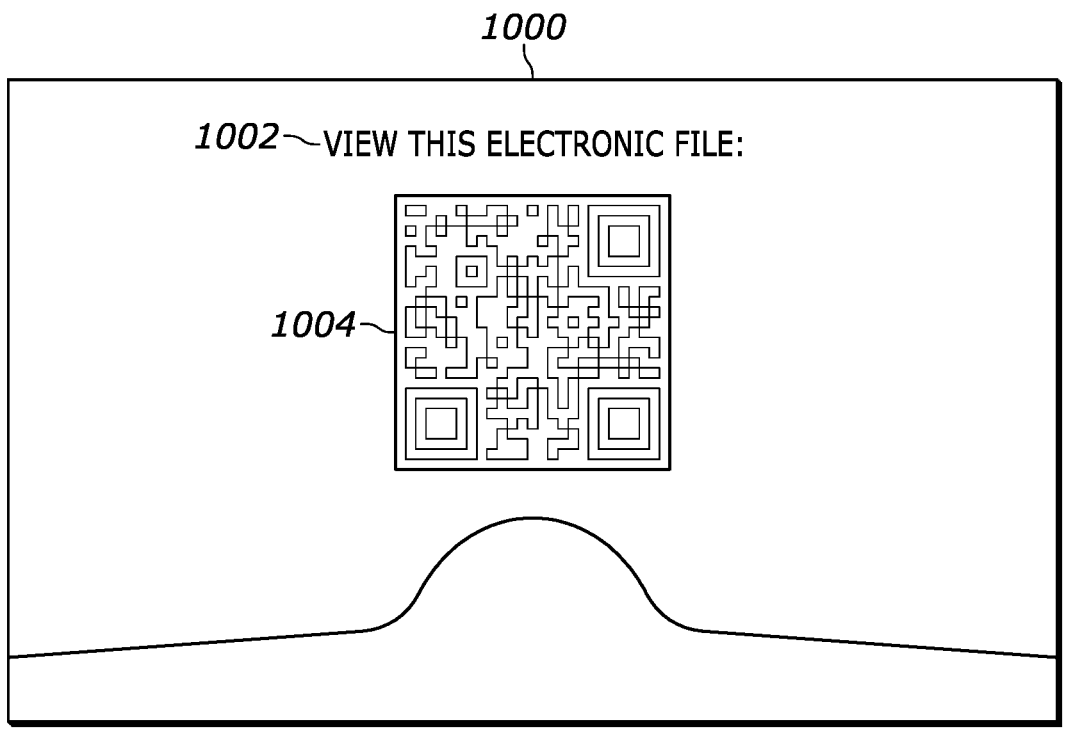
FIGS. 10 and 11 illustrate another example in which a QR code is presented on the display of another device such as a laptop computer in order for an AR device to identify content to present on the AR device's display.
Figure 11:
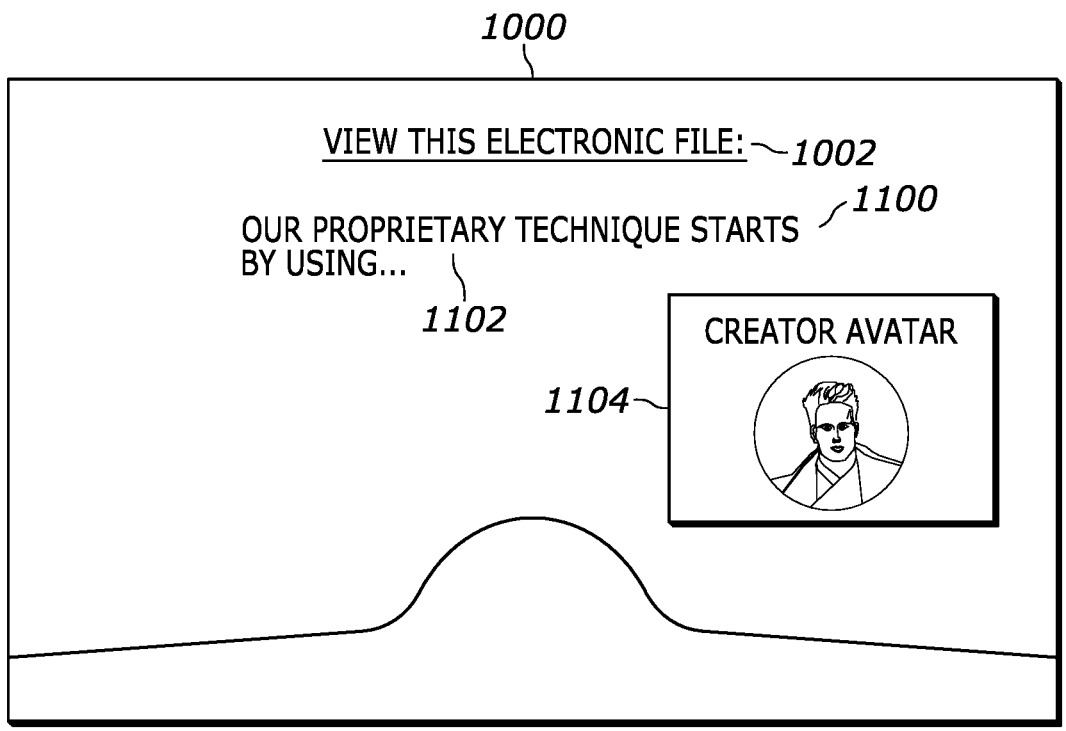

Moving on from the airport example, a different example is reflected in FIGS. 10 and 11. For this example, suppose a file or document is electronically presented on the display 1000 of a device other than the AR device being used by the user, such as the display of a laptop computer that is being viewed by the user through the transparent display of the AR headset as shown. In order to protect the content presented on the display 1000 from prying eyes and/or exposure to unauthorized people nearby, as shown in FIG. 10 the display 1000 of the laptop itself might only present a prompt 1002 to view certain content using a QR code 1004, along with presenting the QR code 1004 itself.

The user's headset may then identify the QR code 1004 using its camera and then decrypt the QR code 1004 with a decryption key already provided to or downloaded by the headset. For example, the key might have been provided separately in an email to the user or even printed on a non-electronic document that may then be read by the headset as disclosed above. In any case, FIG. 11 shows that responsive to decrypting the QR code 1004 the headset may then present content 1100 on its own transparent display using AR software to appear as though actually presented on and by the separate display 1000 of the laptop.

As shown in FIG. 11, the content 1100 may include words 1102, images and/or photographs 1104, and even other types of content encrypted and encoded into the QR code 1004 such as three-dimensional (3D) virtual/graphical objects. As also shown in FIG. 11, the content 1100 may not obstruct other content beyond the QR code 1004 that may be presented on the display 1000 itself, such as the prompt 1002 or other content that might still be presented on the display 1000 including a taskbar, applications list, window of another application executing at the laptop, etc.

Figure 12:
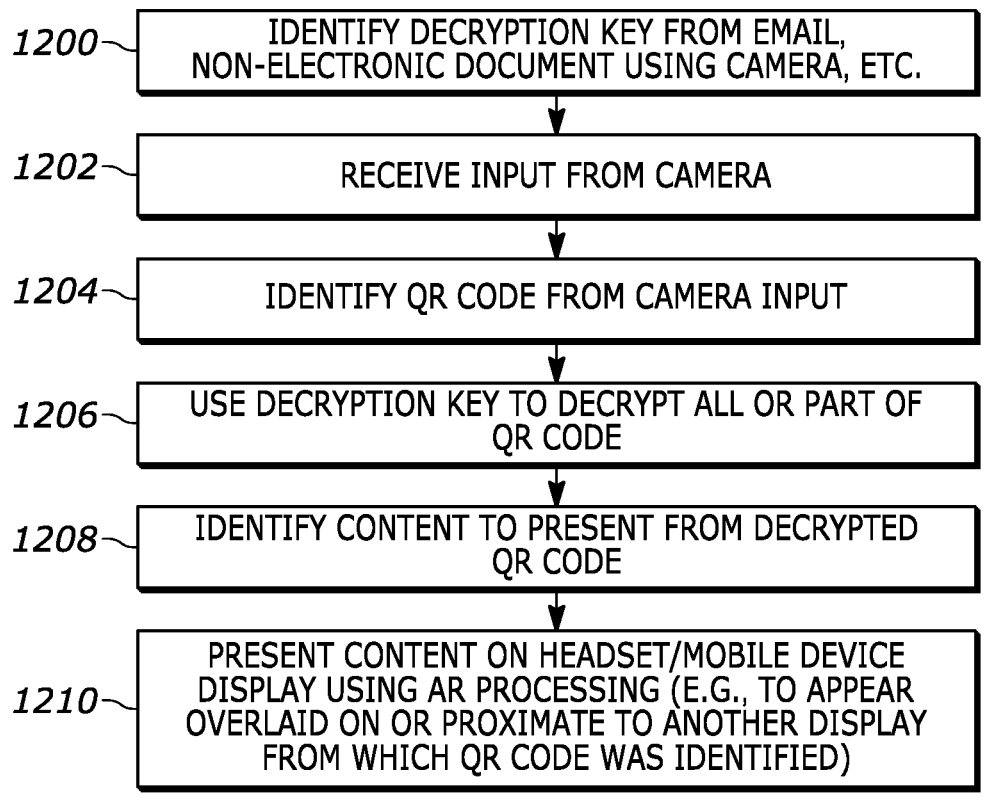
FIG. 12 is a flow chart of an example algorithm that may be executed by an AR device consistent with present principles.

Additionally, note before moving on to the description of FIG. 12 that the content 1100 might also be presented offset from the display 1000 in some examples rather than being presented to mimic actually being presented on it, similar to as already set forth above.

Now in reference to FIG. 12, example logic is shown that may be executed by an AR device such as an AR headset or other device capable of presenting AR content on its display, such as a smart phone or tablet computer. Beginning with block 1200, the device may identify a decryption key from an email, from a non-electronic document, from an electronic document or even from other electronic data or communication, etc. The logic may then continue to block 1202 where the device may receive input from a camera, such as a front-facing camera of the device. The logic may then proceed to block 1204 where the device may identify a QR code from the camera input received at block 1202, such as by using object recognition.

From block 1204 the device may proceed to block 1206 where the decryption key received or identified at block 1200 may be used to decrypt all or part of the identified QR code. The logic may then proceed to block 1208 where the device may identify the content to present based on the decryption of the QR code itself. From block 1208 the logic may then proceed to block 1210 where the device may present the content on the AR device's display using AR processing, e.g., so that the content appears overlaid on or proximate to another electronic display or other object on which the QR code itself is located.

Figure 13:
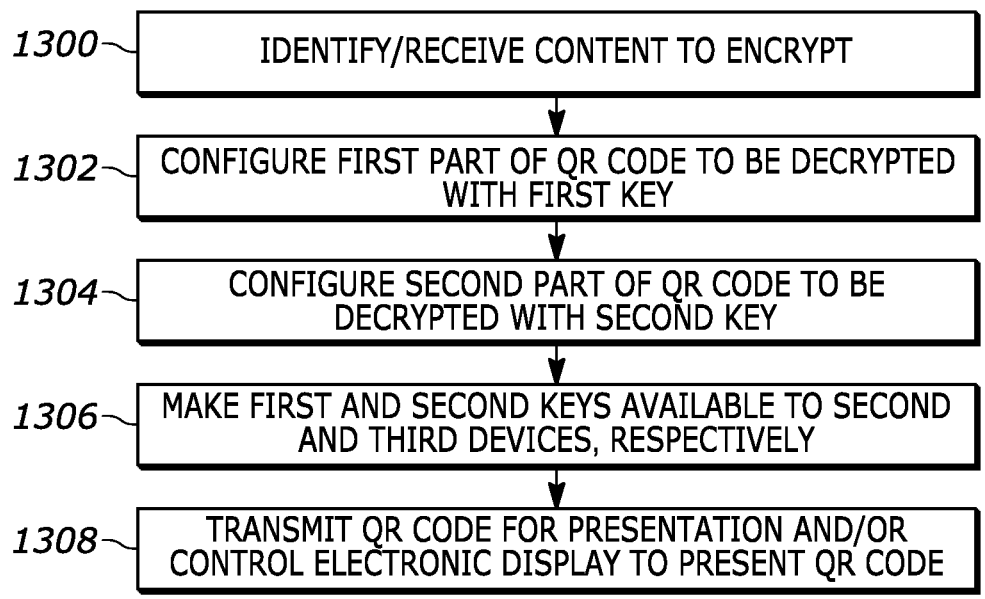
FIG. 13 is a flow chart of an example algorithm that may be executed by a server or other device for generating a QR code consistent with present principles.

Continuing the detailed description in reference to FIG. 13, it shows example logic that may be executed by a device to configure a QR code for decryption consistent with present principles. For example, the logic of FIG. 13 may be executed by a server or other device for the Raleigh-Durham airport according to the example above. Beginning at block 1300, the device may identify and/or receive content to encrypt, such as content designated by a system administrator or data managed by the server itself (e.g., real-time flight information). The logic may then proceed to block 1302 where the device may configure at least a first part of the QR code, if not all of the QR code, to be decrypted using a first key. For example, at block 1302 the content may be encrypted using one of the encryption algorithms mentioned above and then the encrypted text or byte string may be used to generate all or part the QR code. From block 1302 the logic may then proceed to block 1304 where the device may similarly configure a second part of the QR code to be decrypted with a second, different decryption key (e.g., if not all of the QR code was generated for decryption using the same key).

The logic may then proceed to block 1306 where the device may make the first and second keys available to second and third devices, respectively. For example, the device may email the respective keys to email addresses for various users, whose respective AR devices may then use the keys to access content specific to the respective users. Or, the device may make the first and second keys available to second and third devices by sending the keys to other computers that might then print the keys on respective non-electronic documents for use as disclosed herein (e.g., different check-in terminals at an airport). Or, the device may itself print the keys on respective non-electronic documents so that respective AR devices might then read the keys using their own respective cameras.

From block 1306 the logic of FIG. 13 may then proceed to block 1308 where the device may transmit the QR code itself for presentation on the display of another device under control of the other device, such as for presentation on the airport display 602 described above or the laptop display 1000 also described above. Additionally or alternatively, at block 1308 the device may actually control the display to present the QR code, whether the display being controlled is located on the device executing the logic of FIG. 13 or is located on another device such as the airport display 602.

Figure 14:
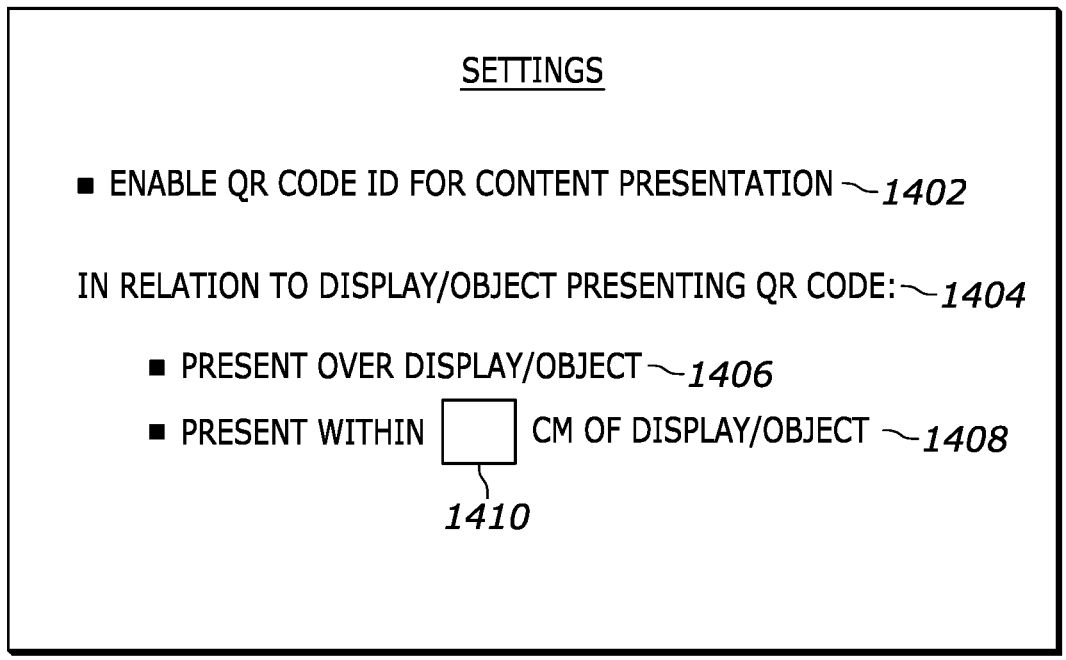
FIG. 14 shows an example graphical user interface (GUI) that may be presented on a display for configuring one or more settings of an AR device consistent with present principles.

Now describing FIG. 14, it shows an example graphical user interface (GUI) 1400 that may be presented on the display of an AR device such as one of the AR headsets or smart phones discussed above. The GUI 1400 may be presented for an end-user to enable or configure one or more settings of the device to operate consistent with present principles.

Beginning first with the setting 1402 shown in FIG. 14, it may be selected using touch or cursor input directed to the adjacent check box in order to set or enable the device to, in the future, identify and attempt to decrypt QR codes to present corresponding content consistent with present principles. For example, selection of the setting 1402 may set the device to in the future undertake the actions described above in reference to the headset/AR device of FIGS. 4-11, and/or to undertake the logic of FIG. 12.

The GUI 1400 may also include a section 1404 related to whether content identified via QR code decryption should, based on end-user preference, be presented as though actually located on another display or other object from which the QR code was read in the first place (by selecting setting 1406), or to present the content within a threshold distance of but not on the other object (by selecting setting 1408). In some examples, the end-user may even configure the threshold distance by directing input to input box 1410 using a hard or soft keyboard to establish the threshold distance according to the user's preference. For example, the threshold distance may be set at two centimeters.

It may now be appreciated that present principles provide for an improved computer-based user interface that improves the functionality and ease of use of the devices disclosed herein. The disclosed concepts are thus rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A first device, comprising:
   at least one processor;
   a display accessible to the at least one processor;
   a camera accessible to the at least one processor; and
   storage accessible to the at least one processor and comprising instructions executable by the at least one processor to:
   identify a decryption key;
   receive input from the camera;
   identify a code based on the input from the camera;
   use the decryption key to decrypt a first part of the code but not all of the code;
   based on the decryption of the first part of the code but not all of the code, identify first content indicated via the code; and
   present the first content on the display but not present second content on the display related to one or more parts of the code other than the first part.

2. The first device of claim 1, wherein the instructions are executable to:

based on the decryption of the code, identify the first content indicated via the code and identify additional content indicated via the code; and
present the first content and the additional content on the display.

3. The first device of claim 1, wherein the instructions are executable to:
present the first content on the display but not present additional content on the display that is identifiable via decryption of the code.

4. The first device of claim 3, wherein the first content to present is indicated via the decryption key itself.

5. The first device of claim 1, wherein the input from the camera is first input from the camera, and wherein the instructions are executable to:
receive second input from the camera; and
identify the decryption key based on the second input.

6. The first device of claim 5, wherein the instructions are executable to:
use the second input to read the decryption key from a non-electronic document indicated via the second input.

7. The first device of claim 1, wherein the display is a first display, and wherein the instructions are executable to:
identify the code from a second display based on the input from the camera, the second display being different from the first display; and
present the first content on the first display using augmented reality processing so that the first content appears via the first display to be disposed on at least a portion of the second display.

8. The first device of claim 1, wherein the first device is a headset, and wherein the display is an at least partially transparent display.

9. The first device of claim 1, wherein the code is a quick response (QR) code.

10. A method, comprising:
identifying, using a first device, a decryption key;
receiving input from a camera on the first device;
identifying a code based on the input from the camera;
using the decryption key to decrypt a first part the code but not all of the code;
based on the decryption of the first part of the code but not all of the code, identifying first content indicated via at least the first part of the code; and
presenting the first content on an electronic display of the first device but not presenting second content on the electronic display related to one or more parts of the code other than the first part.

11. The method of claim 10, wherein the code is a quick response (QR) code.

12. The method of claim 10, wherein the decryption key is configured to decrypt the first part of the code but will not decrypt at least one other part of the code.

13. The method of claim 10, wherein the method comprises:
using the decryption key to decrypt the first part of the code and a second part of the code, the second part being different from the first part;
using the decryption key to identify which of the first content indicated in the first part and the second content indicated in the second part to present, the second content being different from the first content, wherein the first content is identified for presentation based on data indicated in the decryption key; and
presenting the first content on the electronic display of the first device using augmented reality software so that the first content appears disposed in the real world apart from the first device.

14. The method of claim 10, wherein the electronic display is a first electronic display, and wherein the method comprises:
presenting the first content on the first electronic display of the first device using augmented reality software so that the first content appears disposed in the real world on or within a threshold distance of a second electronic display of a second device.

15. The method of claim 10, wherein the input from the camera is first input from the camera, and wherein the method comprises:
receiving second input from the camera; and
based on the second input, identifying the decryption key.

16. The method of claim 15, comprising:
identifying the decryption key, based on the second input, from a non-electronic document.

17. The method of claim 10, comprising:
presenting the first content on the electronic display of the first device using augmented reality software so that the first content appears disposed in the real world apart from the first device.

18. At least one computer readable storage medium (CRSM) that is not a transitory signal, the computer readable storage medium comprising instructions executable by at least one processor to:
configure, at a first device, a first part of a code to be decrypted with a first key;
configure, at the first device, a second part of the code to be decrypted with a second key, the second part being different from the first part;
make the first key available to a second device and make the second key available to a third device, the first, second, and third devices being different from each other; and
one or more of: control an electronic display to present the code, and/or transmit the code to a fourth device different from the first, second, and third devices.

19. The CRSM of claim 18, wherein the second key is different from the first key.

20. The CRSM of claim 18, wherein the code is a quick response (QR) code.

* * * * *